United States Patent
Thomson et al.

(10) Patent No.: US 6,735,689 B1
(45) Date of Patent: May 11, 2004

(54) METHOD AND SYSTEM FOR REDUCING TAKEN BRANCH PENALTY

(75) Inventors: Thomas W. S. Thomson, Santa Cruz, CA (US); Jack Choquette, Mountain View, CA (US)

(73) Assignee: Raza Microelectronics, Inc., San Jose, CA (US)

( * ) Notice: Subject to any disclaimer, the term of this patent is extended or adjusted under 35 U.S.C. 154(b) by 0 days.

(21) Appl. No.: 09/562,061

(22) Filed: May 1, 2000

(51) Int. Cl.[7] .................................................. G06F 9/32
(52) U.S. Cl. ...................................... 712/234; 712/237
(58) Field of Search ................................. 712/234, 237, 712/238, 239, 235, 233, 240, 220, 32

(56) References Cited

U.S. PATENT DOCUMENTS

| | | | | |
|---|---|---|---|---|
| 5,485,587 A | * | 1/1996 | Matsuo et al. ............... | 712/234 |
| 5,826,053 A | * | 10/1998 | Witt ............................. | 712/210 |
| 5,954,816 A | * | 9/1999 | Tran et al. ................... | 712/239 |
| 5,974,260 A | * | 10/1999 | Gotou ........................... | 712/32 |
| 5,978,906 A | * | 11/1999 | Tran ............................ | 712/239 |
| 6,108,774 A | * | 8/2000 | Muthusamy ................. | 712/240 |
| 6,115,792 A | * | 9/2000 | Tran ............................ | 711/128 |
| 6,266,755 B1 | * | 7/2001 | Yeager ......................... | 711/210 |
| 6,336,178 B1 | * | 1/2002 | Favor ........................... | 712/23 |
| 6,609,194 B1 | * | 8/2003 | Henry et al. ................. | 712/238 |

* cited by examiner

*Primary Examiner*—Henry W. H. Tsai
(74) *Attorney, Agent, or Firm*—Fernandez & Assoc, LLP

(57) ABSTRACT

Penalty for taking branch in pipelined processor is reduced by pre-calculating target of conditional branch before branch is encountered, thereby effectively converting branches to jumps. During program execution, pipeline penalty is reduced effectively to that of unconditional jump. Offset bits are replaced in a conditional branch with index bits based on addition of offset bits and a program counter value. Scheme reduces need for cycle to calculate target of taken branch. Scheme may be applied during cache fill or dead cycle when taken branch is read from pipelined cache.

6 Claims, 2 Drawing Sheets

METHOD AND SYSTEM FOR REDUCING TAKEN BRANCH PENALTY

FIELD OF INVENTION

Invention relates to microprocessor design and related signal processing circuit and logic, particularly to technique for reducing taken branch penalty by converting branches to jumps.

BACKGROUND OF INVENTION

Conventional microprocessor design employs various logic for causing branching or redirection effectively of instruction or signal processing flow. For example, a target of a taken branch may be calculated from a given offset value relative to an address of the particular branch instruction. However, such calculation requires an additional step, thereby wasting processor cycles and degrading performance. Thus, because branches occur often during program execution, it is desirable to provide improved branching approach.

SUMMARY OF INVENTION

Invention pre-calculates target of conditional branch before branch is encountered, thereby reducing penalty in taking branch in pipelined processor by converting branches to jumps. During program execution, pipeline penalty is reduced effectively to that of unconditional jump. In particular, offset bits may be replaced in conditional branch using index bits according to offset bits addition and program counter value. Scheme may be applied during cache fill or dead cycle when taken branch is read from pipelined cache.

Preferably, all branches are translated into jump-instruction format by changing offset field of all branch instructions into an index field, and setting flag bit that accompanies the instruction to signify whether target calculation is complete. Such approach may avoid taken branch penalty, in many cases, leaving a penalty only when index calculation results in target of the branch residing in page adjacent to branch itself.

DETAILED DESCRIPTION OF PREFERRED EMBODIMENTS

Preferred embodiment for improved branching scheme is implemented in microprocessor logic and/or circuits, however, it is contemplated that such scheme is applicable to non-processor designs insofar as high-performance pipelined functional processing of signals and/or instructions is performed in hardware, firmware, and/or software.

Generally, in a pipelined microprocessor architecture, wherein one or more signal or data processing paths enable functional computation or other logical calculation of one or more incoming instructions, all branches or instruction redirection conditions that are identified in the instruction stream are translated or otherwise mapped initially into a jump or representative instruction format, preferably by changing one or more offset field of each branch instruction into a corresponding index or other reference field, as well as setting a flag or other identifying bit that accompanies the incoming instruction being processed to signify or otherwise identify effectively that target calculation thereof is substantially complete or incomplete.

In accordance with present objective to improve instruction branch performance, such pre-calculation technique can result in no branch-taken penalty, in many cases, resulting in penalty when index calculation indicates target of the branch is located in page adjacent to present branch. For instance, one or more branches can be translated to one or more jumps at various points in an instruction fetch.

Translation or equivalent instruction branch redirection mapping is performed on-the-fly, while present instruction is filled into instruction cache or similar repository. Such translation may be performed after given instruction fetch, but before being fed to remainder of applicable pipeline via instruction buffer or other equivalent data channel. One or more instruction buffers may be used in microprocessor fetch unit, for example, between instruction cache and remainder of processor pipeline logic, thereby allowing fetch unit effectively to fetch ahead, and maximize performance by having instructions available for rest of pipeline.

Figure 1:
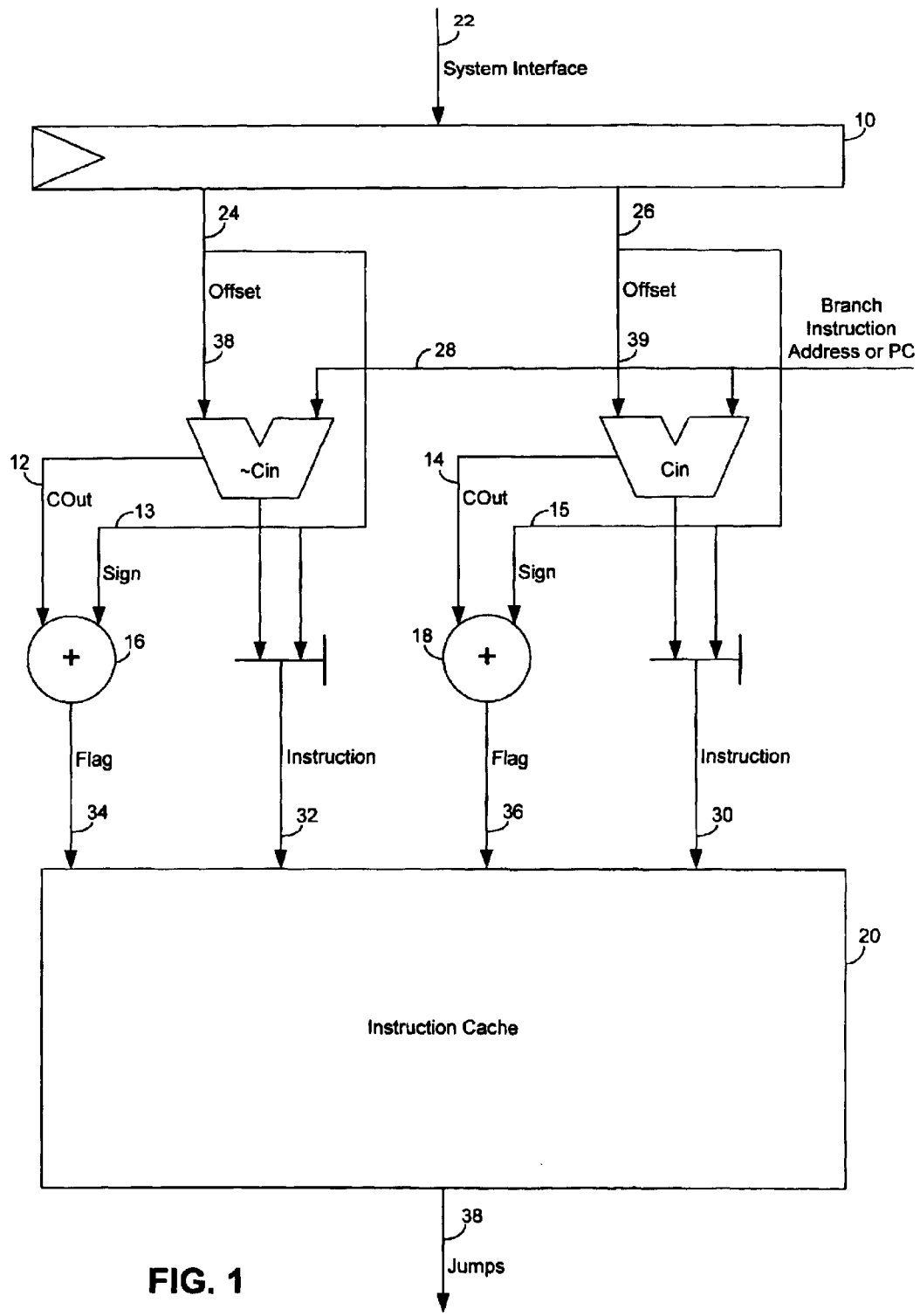
FIGS. 1–2 are logic diagrams for implementing preferred embodiments of present invention.

FIG. 1 logic diagram shows functional processing scheme for branch translation to jumps while filling instruction cache 20. As shown, two instructions 24, 26 are retrieved at a time from system interface 22 through latch or other device 10. In pre-calculation approach, program counter (PC) 28 of the potential branch is added to offset bits 38 and 39 of the branch instruction, regardless which instruction pair is deemed to be branching type. Hence, non-branch instruction simply bypass adders 12, 14 that are used to translate 24, 26 offset bits 38, 39 to index bits. Moreover, during translation, if branch target is determined to reside in adjacent page, then flag bit is set via decoder logic 16, 18; and instructions 32, 30, including flag bits 34, 36 are loaded into instruction cache 20.

Preferably, when offset bits 38, 39 are provided in branch instruction 24, 26 sufficiently, such that target can be more than minimum page size removed from such branch, slightly different translation may be employed. For example, minimum page size may be defined as page size at which so-called Translation LookAside Buffer (TLB) has no effect upon virtual to physical mapping. In this case, only lower offset bits, e.g., corresponding to minimum page size, are translated to index bits, while upper offset bits are preserved as offset bits.

Hence, in this methodology, TLB serves effectively to translate instruction branching information from virtual Program Counter values to corresponding physically tagged values provided in instruction cache.

Additionally, flag bits 34, 36 may be set only when carry 12, 14, and sign bits 13, 15 will result in upper bits of target PC changing during translation. Hence, when branch is read from instruction cache 20, upper offset bits are used in calculation of target address, whereby penalty is encountered. However, since lower offset bits are translated, penalty is taken only when target is in different page; and when branch and target are in same page, no penalty applies.

Such penalty restriction serves to avoid hazard associated with TLB change between instruction cache fill and actual branching times, such that present branch has new physical address that renders invalid virtual address of branch instruction or Program Counter (PC) used for calculation. Such hazard arises from translation occurring independently from execution of given branch. It is contemplated that minimum page size is 4K bytes.

Figure 2:
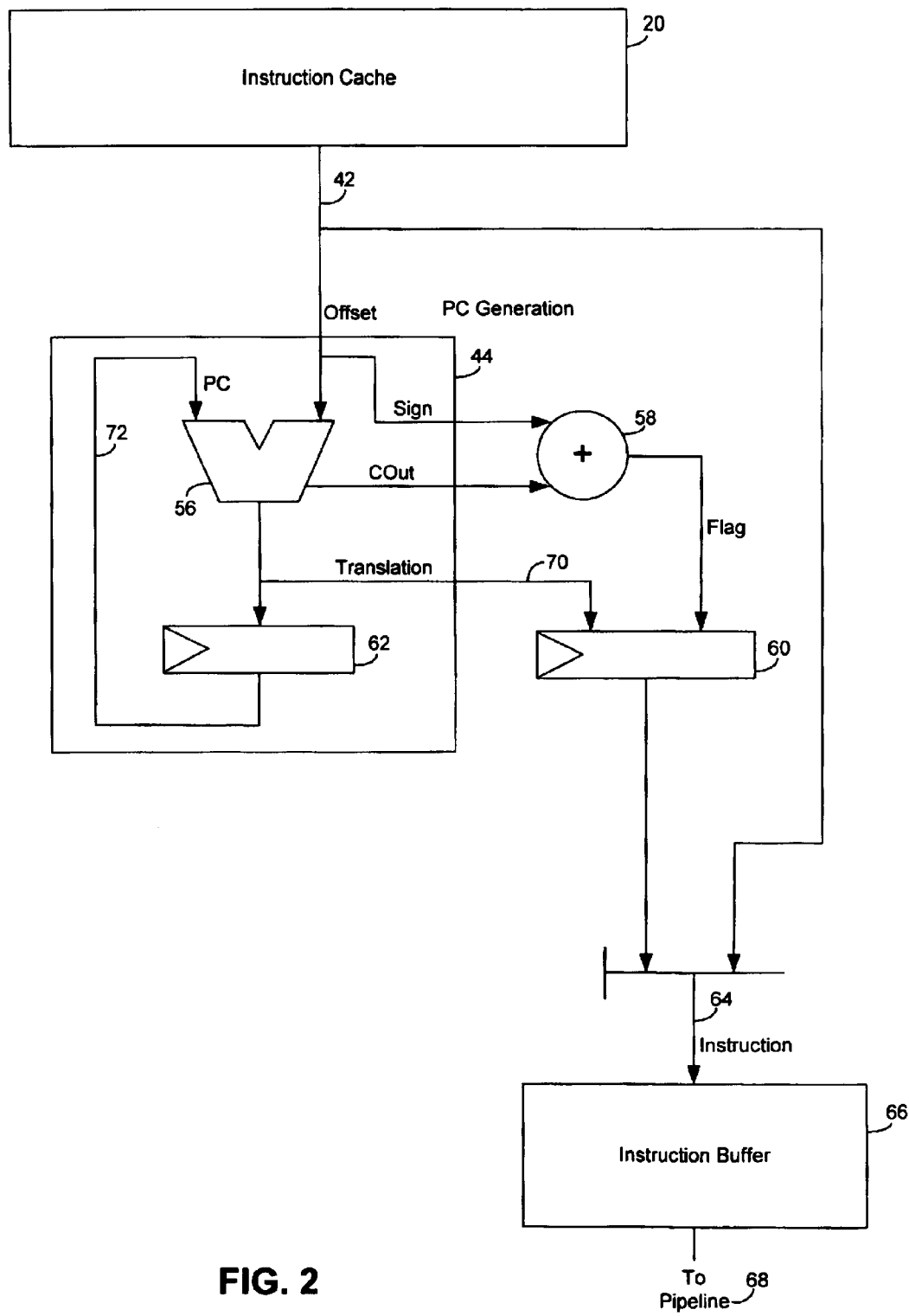

Optionally, in alternate embodiment unrestricted by foregoing TLB hazard, translation is performed when branch is read from instruction cache 20 at execution time, prior to entry into instruction buffer 66 and pipeline access 68. As shown in FIG. 2 logic diagram, calculated lower address bits 62, 72 may be used by adder 56, 58 in PC generation block 44 to translate 70 branch offset bits 42 into index value, i.e., lower bits of target are captured and substituted for offset bits in branch instruction 60, 64. Translated branch 64 is entered into instruction buffer 66 while target is being fetched; and when read from instruction buffer 66, penalty is taken only when target is located on adjacent page. Page size is determined by number of offset bits 42 in instruction (e.g., page size is 256M bytes). Here, translation is performed only on taken branches, unlike other embodiment that translates regardless of branch taken. Moreover, penalty may apply when non-taken branch is mis-predicted and the target PC has to then be re-calculated, but all offset bits can be translated regardless of page size.

Foregoing described embodiments of the invention are provided as illustrations and descriptions. They are not intended to limit the invention to precise form described. Other variations and embodiments are possible in light of above teachings, and it is thus intended that the scope of invention not be limited by this Detailed Description, but rather by Claims following.

What is claimed is:

1. In a pipelined processor for executing instructions, instruction processing method comprising the steps of:
   pre-calculating a target of a conditional branch during a cache fill or a dead cycle when taken branch is read from a pipelined cache and prior to encountering the conditional branch, the conditional branch having a plurality of offset bits; and
   converting the conditional branch to an unconditional jump, wherein the offset bits in the conditional branch are replaced with a plurality of index bits, the index bits generated using the plurality of offset bits and a program counter value.

2. In a pipelined processor for executing instructions, instruction processing method comprising the steps of:
   pre-calculating a target of a conditional branch prior to encountering the conditional branch by changing one or more offset fields of one or more branch instructions into one or more index fields, the conditional branch having a plurality of offset bits;
   setting one or more flag bits to signify whether a target calculation is complete; and
   converting the conditional branch to an unconditional jump, wherein the offset bits in the conditional branch are replaced with a plurality of index bits, the index bits generated using the plurality of offset bits and a program counter value.

3. In a pipelined processor for executing instructions, instruction processing method comprising the steps of:
   pre-calculating a target of a conditional branch prior to encountering the conditional branch, the conditional branch having a plurality of offset bits; and
   converting the conditional branch to an unconditional jump, wherein the offset bits in the conditional branch are replaced with a plurality of index bits, the index bits generated using the plurality of offset bits and a program counter value, thereby a branch taken penalty is applied thereto only when an index calculation results in the target of the conditional branch being determined to be located in a page that is adjacent to such branch.

4. In a pipelined processor for executing instructions, an apparatus for reducing taken branch penalty comprising:
   a circuit for pre-calculating a target of a conditional branch during a cache fill or a dead cycle and prior to encountering the conditional branch by converting the conditional branch to an unconditional jump, the circuit having an adder with a first input for receiving one or more offset bits, a second input for receiving a program counter value, and an output, the adder translating the one or more offset bits and the program counter value to produce a plurality of index bits as an instruction to the output, thereby replacing the one or more offset bits in the conditional branch with the plurality of index bits; and
   an instruction cache for storing the instruction in a jump-instruction format for jumping to the target.

5. In a pipelined processor for executing instructions, an apparatus for reducing taken branch penalty comprising:
   a circuit for pre-calculating a target of a conditional branch prior to encountering the conditional branch by converting the conditional branch to an unconditional jump and the by setting a flag bit to indicate target calculation completion, the circuit having an adder with a first input for receiving one or more offset bits, a second input for receiving a program counter value, and an output, the adder translating the one or more offset bits and the program counter value to produce a plurality of index bits as an instruction to the output, thereby replacing the one or more offset bits in the conditional branch with the plurality of index bits; and
   an instruction cache for storing the instruction in a jump-instruction format for jumping to the target.

6. In a pipelined processor for executing instructions an apparatus for reducing taken branch penalty comprising:
   a circuit for pre-calculating a target of a conditional branch prior to encountering the conditional branch by converting the conditional branch to an unconditional jump when an index calculation results in the target of the conditional branch determined to be located in a page that is adjacent to the conditional branch, the circuit having an adder with a first input for receiving one or more offset bits a second input for receiving a program counter value, and an output, the adder translating the one or more offset bits and the program counter value to produce a plurality of index bits as an instruction to the output, thereby replacing the one or more offset bits in the conditional branch with the plurality of index bits; and
   an instruction cache for storing the instruction in a jump-instruction format for jumping to the target.

* * * * *